United States Patent
Ye et al.

(10) Patent No.: US 12,146,820 B2
(45) Date of Patent: Nov. 19, 2024

(54) TEST SYSTEM FOR MEASURING GAS PERMEATION PARAMETERS OF ULTRA-LOW PERMEABILITY MEDIUM IN MULTI-FIELD AND MULTI-PHASE COUPLING CONDITIONS

(71) Applicant: TongJi University

(72) Inventors: Weimin Ye, Shanghai (CN); Linyong Cui, Shanghai (CN); Qiong Wang, Shanghai (CN); Yuheng Ji, Shanghai (CN); Yonggui Chen, Shanghai (CN); Bao Chen, Shanghai (CN)

(73) Assignee: TongJi University, Shanghai (CN)

( * ) Notice: Subject to any disclaimer, the term of this patent is extended or adjusted under 35 U.S.C. 154(b) by 255 days.

(21) Appl. No.: 17/865,348

(22) Filed: Jul. 14, 2022

(65) Prior Publication Data

US 2024/0019351 A1    Jan. 18, 2024

(51) Int. Cl.
*G01N 15/08* (2006.01)
*G01B 7/24* (2006.01)
*G01N 33/24* (2006.01)
*G01N 15/00* (2006.01)

(52) U.S. Cl.
CPC ........... *G01N 15/0826* (2013.01); *G01B 7/24* (2013.01); *G01N 15/0806* (2013.01); *G01N 2015/0015* (2013.01)

(58) Field of Classification Search
CPC .... G01N 15/00; G01N 15/08; G01N 15/0806; G01N 15/0826; G01N 33/24; G01N 2015/0015; G01B 7/24
See application file for complete search history.

(56) References Cited

FOREIGN PATENT DOCUMENTS

| CN | 109253962 A | * | 1/2019 | ......... G01N 15/0826 |
| CN | 110702876 A | * | 1/2020 | |
| CN | 110487697 B | * | 12/2023 | ......... G01N 15/0826 |
| WO | WO-2021143229 A1 | * | 7/2021 | ......... G01N 15/0806 |

OTHER PUBLICATIONS

Machine Translation of CN-110702876-A (Year: 2020).*
Machine Translation of CN-110487697-B (Year: 2023).*
Machine Translation of CN-109253962-A (Year: 2019).*
Machine Translation of WO-2021143229-A1 (Year: 2021).*

* cited by examiner

*Primary Examiner* — Nguyen Q. Ha

(57) ABSTRACT

A test system for measuring the gas permeation parameters of an ultra-low permeability medium in multi-field and multi-phase coupling conditions, comprising a triaxial permeation chamber, a deformation monitoring apparatus, a temperature sensing control apparatus, a volume/pressure controller, a bias stress loading apparatus, a gas injection apparatus, an outlet buffer container, and an ultra-low permeation flow monitoring apparatus. During the test, first applying temperature and triaxial stress control to a rock-soil mass sample; using the gas injection apparatus to inject high-pressure gas into the rock-soil mass sample; after permeation, the high-pressure gas enters the outlet buffer container and the ultra-low permeation flow monitoring apparatus to acquire the gas permeation flow; and, in the test process, the deformation monitoring apparatus can measure the local absolute deformation of the rock-soil mass sample. Full-process monitoring of the gas permeation of an ultra-low permeability medium in multi-field and multi-phase coupling conditions is thereby implemented.

1 Claim, 3 Drawing Sheets

TEST SYSTEM FOR MEASURING GAS PERMEATION PARAMETERS OF ULTRA-LOW PERMEABILITY MEDIUM IN MULTI-FIELD AND MULTI-PHASE COUPLING CONDITIONS

CROSS REFERENCE TO RELATED PATENT APPLICATION

The present application is the US national stage of PCT/CN2020/121324 filed on Oct. 15, 2020, which claims the priority of the Chinese patent application No. 202010053478.6 filed on Jan. 17, 2020, which is incorporated herein by reference.

FIELD OF THE INVENTION

The present application belongs to a civil engineering (geotechnical) and geological engineering technical field. It relates to the test system for measuring gas permeation parameters of ultra-low permeability medium in multi-field and multi-phase coupling conditions.

TECHNICAL BACKGROUND

Deep geological disposal of high-level radioactive waste (HLW) is by setting a variety of barriers, the HLW is sealed in suitable rock 500~1000 m below the surface of the earth so that the leakage and migration of nuclides is prevented. Depending on the surrounding rock, the repository can be divided into single barrier repository and double barrier repository. Among them, hard rock stratum is selected as the surrounding rock of double barrier repository, such as the US *Yucca* Mountain repository, the repositories in Japan, and China Beishan preselected repository and so on. For double barrier repository, high pressure bentonite with montmorillonite as a main component is most suitable for artificial barrier cushioning/backfill material, it includes multiple functions such as water barrier, chemical barrier, and mechanical barrier.

During repository construction and long-term operation process, the bentonite water swell because of restriction of surrounding rock and the infiltration of groundwater, and the nuclear waste in the repository decays and generates heat, and chemical composition of groundwater in the surrounding rock solutes the concrete structure of repository and generates high alkali solution. They will affect the barrier/backfill performance of high-pressure bentonite.

Furthermore, the study also found that, due to the waste canister housing metal corrosion, microbial degradation, radiolysis of water, a large amount of gas (hydrogen, methane, carbon dioxide, etc.) is generated, and the gas continuously accumulate, thereby producing a high-pressure gas. Thus, in the long-term operation process of repository, the high-pressure bentonite as barrier/backfill material subjects to extremely complicated heat (T)-water (H)-mechanics (M)-chemical (C)-gas (G) multi-field multi-phase coupling process.

For the gas seepage test of ultra-low permeability medium in multi-field and multi-phase coupling conditions, existing test apparatus includes three major categories: constant-volume permeation device, a constant volume radial seepage tester, and isotropic stress infiltration device. Wherein the constant-volume permeation device and the constant volume radial seepage tester monitor the flow at the outlet and could only obtain material parameters in macroscopic, such as permeability. For isotropic stress infiltration device, by means of flexible boundary confining pressure control system, by monitoring the gas pressure and flow data, it can qualitatively analyze the gas seepage path distribution in the seepage process and the effect of stress level (isotropic stress status) on gas permeation process. However, these three test apparatuses cannot simulate the influence of complex conditions such as temperature field and stress field on gas permeability in the test. Thus, it is required to develop experimental device which is suitable for studying the effect of Thermal (T)-water (H)-mechanics (M) coupling on multiphase seepage process.

SUMMARY OF THE PRESENT INVENTION

The object of the present application: overcome the disadvantages of the prior art, providing a test system for measuring gas permeation parameters of ultra-low permeability medium in multi-field and multi-phase coupling conditions, it can be widely used in gas permeation test such as deep geological disposal of nuclear waste, landfill, mine tailings treatment, $CO_2$ capture and geological storage, compressed air energy storage, and shale gas exploitation. It can obtain gas permeation parameters of ultra-low permeability medium under Thermal (T)-water (H)-mechanics (M) coupling condition quickly and accurately. It has important engineering significance and practical value.

To achieve the objectives above, the present application provides the following technical solutions:

A test system for measuring the gas permeation parameters of an ultra-low permeability medium in multi-field and multi-phase coupling conditions, which comprising a triaxial permeation chamber, a deformation monitoring apparatus, a temperature sensing control apparatus, a volume/pressure controller, a bias stress loading apparatus, a gas injection apparatus, an outlet buffer container, and an ultra-low permeation flow monitoring apparatus.

The triaxial permeation chamber is the main part of the test system, it comprises a housing and an inner cavity.

The housing of the triaxial permeation chamber comprises base, top cover, and side ring, is made of stainless steel. The base and the side ring are connected tightly by several bolts in horizontal. The joints between the base and the side ring, the top cover and the side ring are sealed with several O-rings. The base is provided with an air inlet, an air outlet, and a water supply hole. The top cover is provided with an exhaust hole, a thermal probe hole, and a bearing shaft hole.

The inner cavity of the triaxial permeation chamber is provided with several triaxial chamber pillars, rock-soil mass sample, upper metal cylinder and lower metal cylinder. The inner cavity of the triaxial permeation chamber could be filled with liquid.

The triaxial chamber pillars are vertically connected between the base and the top cover, and are equidistant along the circumference of the base to support and fix the base and the top cover.

The rock-soil mass sample is the tested material and is installed between the upper metal cylinder and the lower metal cylinder. The cross-sectional dimensions of the upper metal cylinder and the lower metal cylinder are the same as the rock-soil mass sample. In the test, high-strength emulsion film is used to wrap the upper metal cylinder, the lower metal cylinder, and the rock-soil mass sample to make the three closely contact without separation. The upper metal cylinder and the lower metal cylinder are provided with air vents. The bottom end of the air vent of the upper metal cylinder and the top end of the lower metal cylinder connect with the rock-soil mass sample directly.

The top end of the air vent of the upper metal cylinder connects the top end of the air outlet of the base by conduit. The bottom end of the air vent of the lower metal cylinder connects the top end of the air inlet of the base.

The deformation monitoring apparatus is installed in the inner cavity of the triaxial permeation chamber, it comprises several eddy current sensors, several deformation monitoring frames, and several metal pads. The eddy current sensors are fixed on the deformation monitoring frames, and they are equidistant spaced around the rock-soil mass sample along the height and circumference of the rock-soil mass sample.

The deformation monitoring frames are equidistant spaced along the circumference of the rock-soil mass sample.

The metal pads adhered to the outer surface of the high-strength emulsion film which wraps the rock-soil mass sample, and are equidistant spaced along the height and circumference of the rock-soil mass sample. The metal pad is directly opposite to the probe of the eddy current sensor and keeps a certain distance. The eddy current sensor could accurately measure the static and dynamic relative displacement between the metal pad and the probe. And calculate the local absolute deformation of the rock-soil mass sample in permeation process from the real time measured relative displacement of metal pads.

The temperature sensing control apparatus is installed outside the housing of the triaxial permeation chamber, comprises a heater, a temperature controller, a thermal probe. The heater is wrapped outside the side ring of the triaxial permeation chamber. By heating the side ring made of stainless steel, the heat is transmitted to the liquid filled in the inner cavity of the triaxial permeation chamber. The temperature controller connects with the heater through wire, it could automatic control the on-off of the heater power supply according to the temperature setting value and the measured temperature of the liquid filled in the inner cavity of the triaxial permeation chamber. A thermal probe extends its probe into the liquid filled in the inner cavity of the triaxial permeation chamber through the thermal probe hole to measure the temperature of the liquid. Then the real-time measured temperature data is transmitted to the temperature controller through the wire. The heater, the temperature controller, and the thermal probe together form a closed-loop control device, it can accurately control the temperature of the tested rock-soil mass sample during the permeability test.

The volume/pressure controller connects to the water supply hole of the triaxial permeation chamber through a conduit. For an assembled triaxial permeation chamber, when the exhaust hole is open, the volume/pressure controller could inject or discharge liquid into the inner cavity of the triaxial permeation chamber, when the exhaust hole is closed, pressure can be applied to the liquid in the inner cavity of the triaxial permeation chamber to exert confining pressure on the rock-soil mass sample.

The bias stress loading apparatus comprises beam, weighing sensor, bearing shaft, bearing, operating platform, load speed controller, vertical shaft, and two columns. The columns are vertically fixed on the operating platform for fixing and supporting. The beam is fixed on the column. The vertical shaft is fixed in the middle of the beam. The weighing sensor is fixed at the bottom end of the vertical shaft to measure the axial load. The bearing shaft passes through the bearing shaft hole of the top cover of the triaxial permeation chamber. The top end of the bearing shaft connects to the weighing sensor, the bottom end of it connects to the top of the upper metal cylinder, and it is used to transfer axial load from bottom to top.

The bearing is arranged on the inner wall of the bearing shaft hole of the top cover and is in contact with the side wall of the bearing shaft. The triaxial permeation chamber can rise or fall under the condition that the absolute position of the bearing shaft is fixed.

The main part of the load speed controller is installed inside the operating platform, and the top extends out of the operating platform and contacts with the base of the triaxial permeation chamber to lift or lower the triaxial permeation chamber. Because the absolute position of the bearing shaft in top is fixed, raising or lowering the triaxial permeation chamber can realize apply or remove axial compression load on the rock-soil mass sample.

The gas injection apparatus comprises infinite volume controller, booster pump, gas buffer vessel, and pneumatic hydraulic convertor. The infinite volume controller is connected to the hydraulic end of the pneumatic hydraulic convertor through a conduit. The liquid in the infinite volume controller could be input to the hydraulic end of the pneumatic hydraulic convertor in the form of constant volume, pressure and rate.

The booster pump uses compressed air as the power source, which can pressurize helium and send it to the gas buffer vessel through a conduit.

One end of the gas buffer vessel is connected to the booster pump through the conduit, and the other end is connected to the pneumatic end of the pneumatic hydraulic convertor through a conduit. It buffers the high-pressure gas sent by the booster pump and then sends to the pneumatic end of the pneumatic hydraulic convertor.

The pneumatic hydraulic convertor is made of high-strength stainless steel. The hydraulic end of the pneumatic hydraulic convertor is connected to the infinite volume controller through a conduit, and the pneumatic end is connected to the gas buffer vessel through a conduit. Piston is used internally to isolate the pneumatic end from the hydraulic end.

The hydraulic pressure is input into the pneumatic hydraulic convertor through the infinite volume controller and converted into the pneumatic pressure with constant volume, pressure, and rate through the piston in the pneumatic hydraulic convertor, and then the high-pressure gas in the pneumatic pressure end of the pneumatic hydraulic convertor is input into the air inlet of the triaxial permeation chamber through the conduit, so that the high-pressure gas is injected into the rock-soil mass sample.

One end of the outlet buffer container is connected to the air outlet of the triaxial permeation chamber through a conduit, and the other end is connected to the ultra-low permeation flow monitoring apparatus through a conduit. The gas from the air outlet of the triaxial permeation chamber is buffered in the outlet buffer container, and the flow of it is measured by the ultra-low permeation flow monitoring apparatus.

The bottom of the outlet buffer container is also provided with a safety valve and an exhaust valve, which can automatically relieve the pressure when the pressure in the outlet buffer container exceeds the upper limit pressure of the safety valve to ensure safety. The exhaust valve is used to manually discharge the gas in the outlet buffer container after the test.

The ultra-low permeation flow monitoring apparatus comprises four gas flow meters, single-chip microcomputer, four relays and four electromagnetic valves.

The gas from the outlet of the outlet buffer container flows into four branch conduits. The four gas flow meters are installed on four branch conduits respectively to measure the gas flow of the conduit. The four gas flow meters have different ranges.

The four gas flow meters connect to the single-chip microcomputer with wires, and the digital flow signal is output to the single-chip microcomputer. The four electromagnetic valves are respectively installed on the four branch conduits to control the on-off of gas on the branch conduit.

The four relays connect to the four electromagnetic valves respectively with wire. The relays connect to the single-chip microcomputer. The single-chip microcomputer controls the on-off of the four relays respectively, so as to control the on-off of the four electromagnetic valves.

The single chip microcomputer can read the measured flow data of the four gas flow meters, automatically select the branch conduit of the optimal range flow meter according to the real-time flow data, and control the on-off of the four relays to control the on-off of the four electromagnetic valves automatically, so that the gas flow in the branch conduit of the optimal range flow meter is on while the gas flow in other branch conduits is off.

The gas flowmeter, single-chip microcomputer, four relays and four electromagnetic valves work together to realize the automatic switching of each branch conduit and continuously and automatically monitor the gas flow of the air outlet of the triaxial permeation chamber.

Compared with the prior art, the present application has the following advantages:

(1) One end of the pneumatic hydraulic convertor connects with the infinite volume controller; the other end connects to a gas pre pressurization device.

The high-pressure gas sent by the gas pre pressurization device is hydraulically driven by the infinite volume controller, which can send the gas medium into the rock-soil mass sample in the triaxial permeation chamber in the form of volume control, pressure control and rate control.

(2) The deformation monitoring apparatus could accurately measure the change of the static and dynamic relative displacement between the metal pad and the end face of the probe, and then indirectly obtain the local absolute deformation of the sample during the permeation process. In addition, the eddy current sensors are non-contact measurement, good long-term reliability, wide measurement range.

(3) The bias stress loading apparatus pushes the base upward through the load speed controller to apply axial load. The loading mode could be stress control and displacement control. It could continuously load and unload.

(4) The ultra-low permeation flow monitoring apparatus adopts several gas flow meters working in parallel to realize automatic switching of different ranges and accurately measure the gas flow at the outlet of the triaxial permeation chamber.

1, triaxial permeation chamber; 2, deformation monitoring apparatus;
3, temperature sensing control apparatus; 4, volume/pressure controller;
5, bias stress loading apparatus; 6, gas injection apparatus;
7, outlet buffer container; 8, ultra-low permeation flow monitoring apparatus;
11, base; 12, top cover; 13, side ring; 14, O-ring; 15, triaxial chamber pillar;
16, rock-soil mass sample; 17, bolt; 18, upper metal cylinder;
19, lower metal cylinder;
111, air inlet; 112, air outlet; 113, water supply hole;
121, exhaust hole; 122, thermal probe hole; 123, bearing shaft hole;
21, eddy current sensor;
22, deformation monitoring frame;
23, metal pad;
31, heater; 32, temperature controller; 33, thermal probe;
51, beam; 52, weighing sensor; 53, bearing shaft; 54, bearing; 55, operating platform; 56, load speed controller; 57, vertical shaft; 58, column;
61, infinite volume controller; 62, booster pump; 63, gas buffer vessel; 64, pneumatic hydraulic convertor;
71, safety valve; 72, exhaust valve;
81, gas flow meter; 82, single-chip microcomputer; 83, relay; 84, electromagnetic valve.

DETAILED DESCRIPTION OF THE EMBODIMENTS

Figure 1:
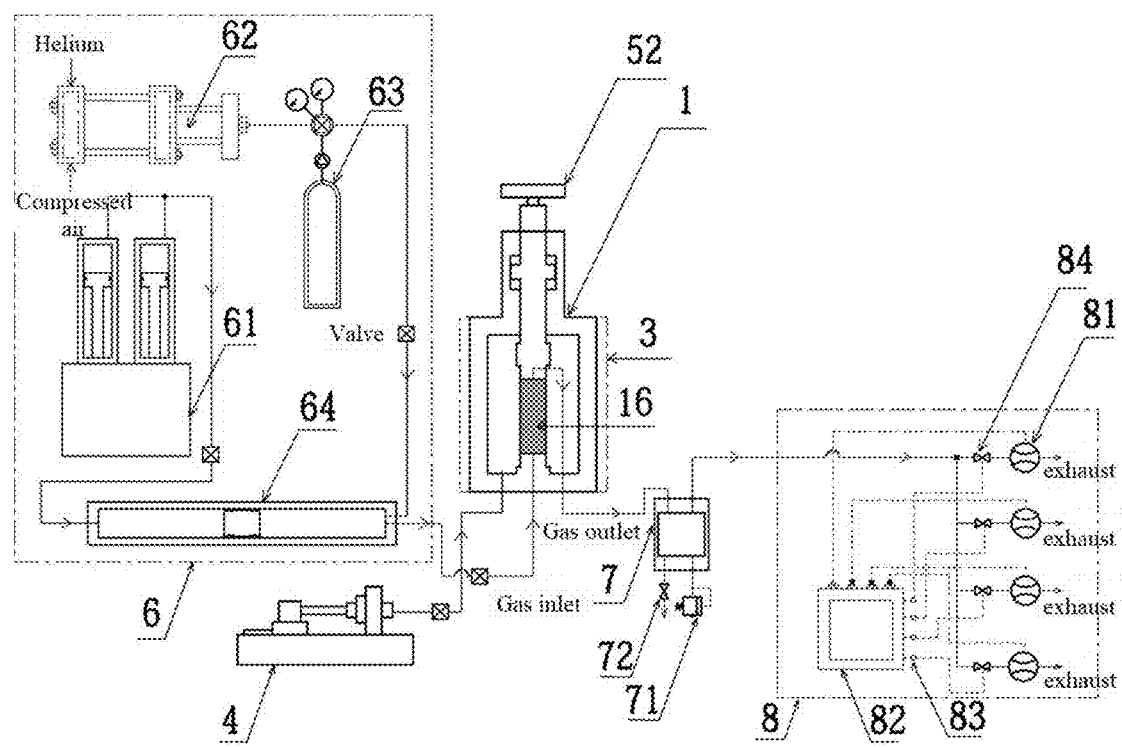
FIG. 1 is an overall schematic structure view of the present application test system.

The embodiments are further described below with the drawings:

As shown in FIG. 1, the test apparatus in the present application comprises triaxial permeation chamber 1, temperature sensing control apparatus 3, volume/pressure controller 4, gas injection apparatus 6, outlet buffer container 7, and ultra-low permeation flow monitoring apparatus 8.

The triaxial permeation chamber 1 is the main part of the system;

The temperature sensing control apparatus 3 is located outside the triaxial permeation chamber 1, it could accurately control the temperature of the rock-soil mass sample by indirect heating during the permeation test.

The volume/pressure controller 4 uses ADVDPC controller. It connects with water supply hole 113 of the triaxial permeation chamber 1 through a conduit. For assembled triaxial permeation chamber 1, when the exhaust hole 121 is open, the volume/pressure controller 4 could inject or discharge liquid from the triaxial permeation chamber 1, when the exhaust hole 121 is closed, pressure can be applied to the liquid in the triaxial permeation chamber 4 to exert confining pressure on the rock-soil mass sample 16, the range of confining pressure is 0~20 MPa.

The gas injection apparatus 6 comprises infinite volume controller 61, booster pump 62, gas buffer vessel 63, and pneumatic hydraulic convertor 64.

The infinite volume controller 61 uses GDSIVC controller. It connects to the hydraulic end of the pneumatic hydraulic convertor 64 through a conduit. The liquid in the infinite volume controller 61 could be input to the hydraulic end of the pneumatic hydraulic convertor 64 in the form of constant volume, pressure, and rate. Working pressure range of it is 0~20 MPa, pressure control accuracy of it is ±0.1 kPa. There is no constraint on volume capacity and the volume control accuracy is ±1 mm³. The lowest working rate is 0.0001 mL/min. The rapid filling/draining rate is up to 72 mL/min.

The booster pump 62 uses compressed air as the power source. It could pressurize helium up to 20 Mpa and send it to the gas buffer vessel 63 by conduit.

The gas buffer vessel 63 connects to the booster pump 62 by conduit in one end, and connects to the pneumatic pressure end of the pneumatic hydraulic convertor 64 by conduit in the other end. It could buffer the high-pressure gas sent from the booster pump 62 and then sent to the pneumatic end of the pneumatic hydraulic convertor 64.

The hydraulic end of the pneumatic hydraulic convertor 64 connects with the infinite volume controller 61 through a conduit, and the pneumatic end is connected to the gas buffer vessel 63 through a conduit. Piston is used internally to isolate the pneumatic end from the hydraulic end. The volume of the pneumatic hydraulic convertor 64 is 2 L and is made of high-strength stainless steel. It is capable of withstanding pressure not less than 20 MPa.

The hydraulic pressure is input into the pneumatic hydraulic convertor 64 through the infinite volume controller 61. The hydraulic pressure is converted into the pneumatic pressure with constant volume, pressure, and rate through the piston in the pneumatic hydraulic convertor 61, and then the high-pressure gas in the pneumatic pressure end of the pneumatic hydraulic convertor 61 is input into the air inlet 111 of the triaxial permeation chamber 1, so that the high-pressure gas is injected into the rock-soil mass sample 16.

The volume of outlet buffer container 7 is 100 mL and is capable of withstanding pressure not less than 20 MPa. One end of the outlet buffer container 7 is connected to the air outlet 112 of the triaxial permeation chamber 1 through a conduit, and the other end is connected to the ultra-low permeation flow monitoring apparatus 8 through a conduit. The gas from the air outlet 112 of the triaxial permeation chamber 1 is buffered here, and the flow of it is measured by the ultra-low permeation flow monitoring apparatus 8.

The bottom of the outlet buffer container 7 is also provided with a safety valve 71 and an exhaust valve 72, which can automatically relieve the pressure when the pressure in the outlet buffer container 7 exceeds 10 MPa, the upper limit pressure of the safety valve 71 to ensure safety. The exhaust valve 72 is used to manually discharge the gas in the outlet buffer container 7 after the test.

The ultra-low permeation flow monitoring apparatus 8 comprises four gas flow meters 81, single-chip microcomputer 82, four relays 83 and four electromagnetic valves 84. The gas from the outlet of the outlet buffer container 7 flows into four branch conduits. The four gas flow meters 81 adopt MFM gas mass flowmeter, are installed on four branch conduits respectively to measure the gas flow of the conduit. The rage of the four gas flow meters are 0~5 mL/min, 0~100 mL/min, 0~1000 mL/min and 0~2000 mL/min respectively. The four gas flow meters 81 connect to the single-chip microcomputer 82 with wires, and the digital flow signal is output to the single-chip microcomputer 82. The four electromagnetic valves 84 use 2W-025-06 electromagnetic valve, are respectively installed on the four branch conduits to control the on-off of the gas on the branch conduit.

The four relays 83 adopt SRD-05 VDC-SL-C relay, connect to the four electromagnetic valves 84 respectively with wire. The relays 83 connect to the single-chip microcomputer 82. The single-chip microcomputer 82 could control the on-off of the four relays 83 respectively, so as to control the on-off of the four electromagnetic valves 84.

The single-chip microcomputer 82 adopts STM32F103VE single-chip microcomputer, reads the data of the four gas flow meters 81, automatically selects the branch conduit of the optimal range gas flow meter according to the measure flow, and automatically controls the on-off of the power supply of the four relays 84, so that the gas flow in the branch conduit of the optimal range flow meter is on while the gas flow in other branch conduits is off.

The gas flow meter 81, single-chip microcomputer 82, four relays 83 and four electromagnetic valves 84 work together to realize the automatic switching of each branch conduit and continuously and automatically monitor the gas flow of the air outlet 112 of the triaxial permeation chamber 1.

Figure 2:
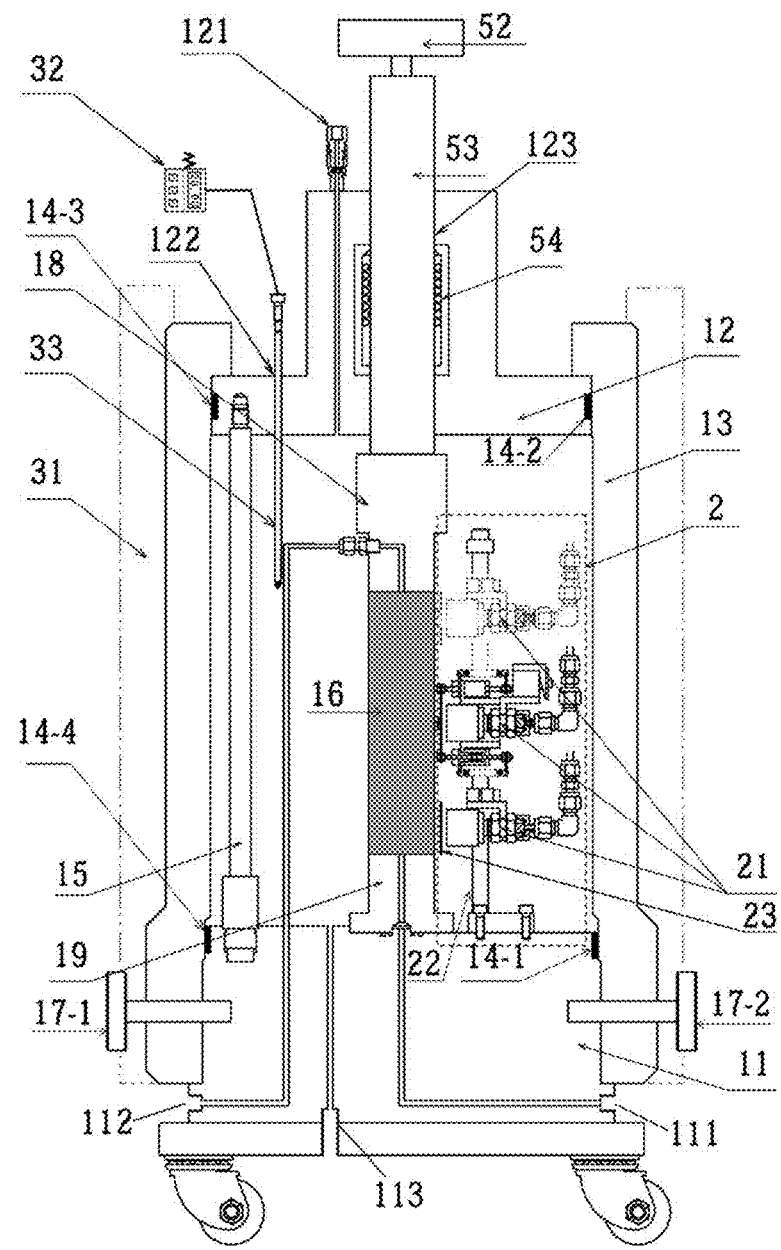
FIG. 2 is a schematic structure view of triaxial permeation chamber, deformation monitoring apparatus, and temperature sensing control apparatus of the present application test system.

As shown in FIG. 2, the triaxial permeation chamber 1 comprises a housing and an inner cavity. A temperature sensing control apparatus 3 is installed outside the housing. A deformation monitoring apparatus 2 is installed inside the inner cavity.

The housing of the triaxial permeation chamber 1 comprises base 11, top cover 12, and side ring 13, all are made of stainless steel. The base 11 and the side ring 13 are connected tightly by four bolts 17 in horizontal. The joints between the base 11 and the side ring 13, the top cover 12 and the side ring 13 are sealed with two O-rings 14. The base 11 is provided with an air inlet 111, an air outlet 112, and a water supply hole 113. The top cover 12 is provided with an exhaust hole 121, a thermal probe hole 122, and a bearing shaft hole 123.

The inner cavity of the triaxial permeation chamber 1 is provided with four triaxial chamber pillars 15, rock-soil mass sample 16, upper metal cylinder 18 and lower metal cylinder 19. The inner cavity of the triaxial permeation chamber 1 could be filled with liquid. The triaxial chamber pillars 15 are vertically connected between the base 11 and the top cover 12, and are equidistant along the circumference of the base 11 to support and fix the base 11 and the top cover 12.

The rock-soil mass sample 16 is the tested material and is installed between the upper metal cylinder 18 and the lower metal cylinder 19. The cross-sectional dimensions of the upper metal cylinder 18 and the lower metal cylinder 19 are the same as the rock-soil mass sample 16. In the test, high-strength emulsion film is used to wrap the upper metal cylinder 18, the lower metal cylinder 19, and the rock-soil mass sample 16 to make the three closely contact without separation. The upper metal cylinder 18 and the lower metal cylinder 19 are provided with air vents. The bottom end of the air vent of the upper metal cylinder 18 and the top end of the lower metal cylinder 19 connect with the rock-soil mass sample 16 directly.

The top end of the air vent of the upper metal cylinder 18 connects to the top end of the air outlet 112 of the base 11 by conduit. The bottom end of the air vent of the lower metal cylinder 19 connects to the top end of the air inlet 111 of the base 11.

The deformation monitoring apparatus 2 is installed in the inner cavity of the triaxial permeation chamber 1, it comprises twelve eddy current sensors 21, four deformation monitoring frames 22, and twelve metal pads 23. The eddy current sensors 21 adopt AEC-55 MS-Z-52 converter. Twelve eddy current sensors 21 are divided into 4 groups, three for each group. The eddy current sensors 21 are fixed on the deformation monitoring frames 22 at equal distance along the height of the rock-soil mass sample 16. The four deformation monitoring frames 22 are equidistant spaced along the circumference of the rock-soil mass sample 16.

The bottom of the deformation monitoring frame 22 is fixed on the base 11 of the triaxial permeation chamber 1.

The twelve metal pads 23 are divided into four group, three for each group. The metal pads 23 adhered to the outer surface of the high-strength emulsion film which wraps the rock-soil mass sample 16, and are equidistant spaced along the height and circumference of the rock-soil mass sample 16. The position of metal patch 23 is directly opposite to the probe of eddy current sensor 21 and the distance between them is 2~4 mm. The eddy current sensor 21 could accurately measure the static and dynamic relative displacement between the metal pad 23 and the probe. And calculate the local absolute deformation of the rock-soil mass sample 16 in permeation process from the real time relative displacement. The range of the local absolute deformation is ±4 mm, the accuracy of the local absolute deformation is 0.3~0.5 μm.

The temperature sensing control apparatus 3 is installed outside the housing of the triaxial permeation chamber 1, it comprises a heater 31, a temperature controller 32, a thermal probe 33. The heater 31 adopts SAQ300 thermostatic heater, it is wrapped outside the side ring 13 of the triaxial permeation chamber 1. By heating the side ring 13 made of stainless steel, the heat is transmitted to the liquid filled in the inner cavity of the triaxial permeation chamber 1. The temperature controller 32 adopts CHB000B temperature controller, it connects with the heater 31 through wire, it could automatic control the on-off of the heater power supply according to the temperature setting value and the measured temperature of the liquid filled in the inner cavity of the triaxial permeation chamber 1. The thermal probe 33 adopts WRP-130 platinum rhodium thermocouple, it extends its probe into the liquid filled in the inner cavity of the triaxial permeation chamber 1 through the thermal probe hole 122 to measure the temperature of the liquid. Then the real-time measured temperature data is transmitted to the temperature controller 32 through the wire. Said heater 31, the temperature controller 32, and the thermal probe 33 together form a closed-loop control device, it can accurately control the temperature of the tested rock-soil mass sample 16 during the permeability test. The temperature control range is 20~100° C.

Figure 3:
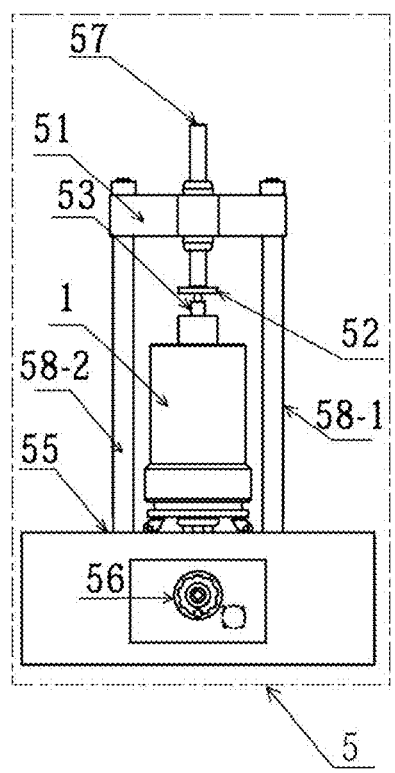
FIG. 3 is a schematic structure view of bias stress loading apparatus and triaxial permeation chamber of the present application test system.

As shown in FIG. 3, the bias stress loading apparatus 5 comprises beam 51, weighing sensor 52, bearing shaft 53, bearing 54, operating platform 55, load speed controller 56, vertical shaft 57, and columns 58.

The two columns 58 are vertically fixed on the operating platform 55 for fixing and supporting. The beam 51 is fixed on the column 58. The vertical shaft 57 is fixed in the middle of the beam 51. The weighing sensor 52 adopts RCD-100 kN load cell, it is fixed at the bottom end of the vertical shaft 57 to measure the axial load, the rage is 0~100 kN. The bearing shaft 53 passes through the bearing shaft hole 123 of the top cover 12 of the triaxial permeation chamber 1. The top of the bearing shaft connects to the weighing sensor 52, the bottom end of it is connected to the top of the upper metal cylinder 18, and it is used to transfer axial load from bottom to top.

The bearing 54 is arranged on the inner wall of the bearing shaft hole 123 of the top cover 12 and is in contact with the side wall of the bearing shaft 53. The triaxial permeation chamber 1 can rise or fall under the condition that the absolute position of the bearing shaft 53 is fixed.

The load speed controller 56 adopts EM SERVO CONTROLLER KO-470 controller, the main part of it is installed inside the operating platform 55, and the top extends out of the operating platform 55 and contacts with the base 11 of the triaxial permeation chamber 1 to lift or lower the triaxial permeation chamber 1. Because the absolute position of the bearing shaft 53 in top is fixed, raising or lowering the triaxial permeation chamber can realize apply or remove axial compression load on the rock-soil mass sample 16. The rage of axial load is 0~100 kN, the range of load velocity is 0.01~100 kN/min.

The present application provides the test system for measuring gas permeation parameters of ultra-low permeability medium in multi-field and multi-phase coupling conditions, its workflow is as follows:

Before test, the base 11, the top cover 12, the side ring 13, the triaxial chamber pillar 15 are separated, the deformation monitoring apparatus 2 is not installed. The conduits of the volume/pressure controller 4, the gas injection apparatus 6, the outlet buffer container 7, and the ultra-low permeation flow monitoring apparatus 8 are connected complete and in closed state.

1) First, the rock-soil mass sample 16, the upper metal cylinder 18 are placed on the lower metal cylinder 19 in sequence, high-strength emulsion film is used to wrap the three to make them closely contact without separation, then install the combitant into triaxial permeation chamber 1, the bottom of the lower metal cylinder 19 is fixed on the base 11, and make the bottom end of the air vent of the upper metal cylinder 19 connects with the top end of the air inlet 111, and connect the top end of the air vent of the upper metal cylinder 18 with the top end of the air outlet 112 by conduit.

2) Fixes the four deformation monitoring frames 22 equidistant spaced along the circumference of the rock-soil mass sample 16 to the base 11 of the triaxial permeation chamber 1. Divide the twelve eddy current sensors 21 into 4 groups, three for each group. The eddy current sensors 21 are fixed on the deformation monitoring frames 22 at equal distance along the height of the rock-soil mass sample 16.

Twelve metal pads 23 are attached to the outer surface of the high-strength emulsion film outside the rock-soil mass sample 16 according to the corresponding positions of the eddy current sensor 21, the distance of the metal pad 23 and corresponding eddy current sensor 21 is 2~4 mm.

3) Fix and connect the base 11 and the top cover 12 with the triaxial chamber pillar 15, insert the bearing shaft 53 from the bearing shaft hole 123 of the top cover 12 into the inner cavity of the triaxial permeation chamber 1, connect its bottom end to the top of the upper metal cylinder 18, then install the side ring 13 of the triaxial permeation chamber 1 to the outside of the base 11 and the top cover 12, and fasten the four bolts 17 that connect base 11 and side ring 13.

4) after the triaxial permeation chamber 1 is assembled, placed it on the operating platform 55 with a pulley. Adjust the load speed controller 56 of the bias stress loading apparatus 5 so that the top of the load speed controller 56 extends out of the operating platform 55 and contacts the base 11 of the triaxial permeation chamber 1; install weighing sensor 52 on the top of the bearing shaft, adjust the position of the vertical shaft 57 of the bias stress loading apparatus 5 so that the vertical shaft 57, the weighing sensor 52, and the bearing shaft 53 are in close contact.

5) Open the exhaust hole 121 and inject liquid into the inner cavity of the triaxial permeation chamber 1 with the volume/pressure controller 4; close the exhaust hole 121 and apply the target pressure to the liquid in the inner cavity of the triaxial permeation chamber 1 using the volume/pressure controller 4 so as to apply the confining pressure to the rock-soil mass sample 16, the target pressure is greater than gas injection pressure of the pneumatic hydraulic convertor 64; at the same time, the axial load is applied to the rock-soil mass sample 16 by setting the load speed controller 56;

6) After the axial and radial pressure of rock-soil mass sample 16 reaches the target value and the deformation is stable, power on the temperature sensing control apparatus 3 to heat the heater 31. Set the temperature of the liquid in the triaxial permeation chamber 1 in the temperature controller 32, and use thermal probe to measure the real-time temperature of the liquid in the triaxial permeation chamber 1, so that the temperature controller 32 could automatic on-off the power of the heater 31 according to the real-time measured temperature.

7) after the liquid temperature in the triaxial permeation chamber 1 reaches the target value and stabilizes, start the booster pump 62 to pressurize helium to target pressure, and the gas at target pressure is input to the pneumatic end of the pneumatic hydraulic convertor 64 through the gas buffer vessel 63;

8) start the infinite volume controller 61 to input the liquid to the hydraulic end of the pneumatic hydraulic convertor 64, actuate pneumatic by hydraulic, the high-pressure gas in the pneumatic hydraulic convertor 64 is stably input to the air inlet of triaxial permeation chamber 1 in the form of constant volume, pressure or rate, so that the high-pressure gas is injected into the rock-soil mass sample 16.

9) after the high-pressure gas permeates the rock-soil mass sample 16, it is input and buffer in the outlet buffer container 7 through air outlet 112, the permeation rate of the gas is measured by the ultra-low permeation flow monitoring apparatus 8, and the permeability coefficient of the gas in the rock-soil mass sample 16 is calculated.

10) Collect the radial deformation data of rock-soil mass sample 16 monitored by eddy current sensor 21 during gas permeability, and comprehensively evaluate the gas permeability performance, the formula of gas permeability rate is $$K_{\mathit{eff}} = \frac{\mu Q_g}{A} \frac{h}{(P_g - P_0)}$$

wherein, $K_{\mathit{eff}}$ is gas permeability rate, is used to evaluate the gas permeability performance;

$\mu$ is dynamic viscosity of gas, it is a constant;

$Q_g$ is the gas flow measured by ultra-low permeation flow monitoring apparatus;

A is the cross-sectional area of rock-soil mass sample 16;

h is the height of rock-soil mass sample 16;

$P_g$ is the pressure of the gas injection apparatus 6 inject to rock-soil mass sample 16;

$P_0$ is the atmospheric pressure

What is claimed is:

1. A test system for measuring gas permeation parameters of an ultra-low permeability medium in multi-field and multi-phase coupling conditions, which comprises a triaxial permeation chamber, a deformation monitoring apparatus, a temperature sensing control apparatus, a volume/pressure controller, a bias stress loading apparatus, a gas injection apparatus, an outlet buffer container, and an ultra-low permeation flow monitoring apparatus;

a test process of the test system comprises: first applying temperature and triaxial stress control to a rock-soil mass sample; then using the gas injection apparatus to inject high-pressure gas into the rock-soil mass sample; the high-pressure gas permeates the rock-soil mass sample and enters the outlet buffer container and the ultra-low permeation flow monitoring apparatus to acquire the gas permeation flow; in the test process, the deformation monitoring apparatus measures the local absolute deformation of the rock-soil mass sample; full-process monitoring of the gas permeation of an ultra-low permeability medium in multi-field and multi-phase coupling conditions is thereby implemented, enabling acquisition of gas permeation features and macroscopic deformation features;

the triaxial permeation chamber is the main part of the test system, it comprises a housing and an inner cavity; the housing of the triaxial permeation chamber comprises base, top cover, and side ring, all are made of stainless steel; the base and the side ring are connected tightly by several bolts in horizontal; the joints between the base and the side ring, the top cover and the side ring are sealed with several O-rings; the base is provided with an air inlet, an air outlet, and a water supply hole; the top cover is provided with an exhaust hole, a thermal probe hole, and a bearing shaft hole; the inner cavity of the triaxial permeation chamber is provided with several triaxial chamber pillars, rock-soil mass sample, upper metal cylinders and lower metal cylinders; the inner cavity of the triaxial permeation chamber could be filled with liquid;

the triaxial chamber pillars are vertically connected between the base and the top cover, and are equidistant along the circumference of the base to support and fix the base and the top cover;

the rock-soil mass sample is the tested material and is installed between the upper metal cylinder and the lower metal cylinder; the cross-sectional dimensions of the upper metal cylinder and the lower metal cylinder are the same as the rock-soil mass sample; in test, high-strength emulsion film is used to wrap the upper metal cylinder, the lower metal cylinder, and the rock-soil mass sample to make the three closely contact without separation; the upper metal cylinder and the lower metal cylinder are provided with air vents; the bottom end of the air vent of the upper metal cylinder and the top end of the lower metal cylinder connects with the rock-soil mass sample directly;

the top end of the air vent of the upper metal cylinder connects the top end of the air outlet of the base by conduit; the bottom end of the air vent of the lower metal cylinders connects the top end of the air inlet of the base;

the deformation monitoring apparatus is installed in the inner cavity of the triaxial permeation chamber, and comprises several eddy current sensors, deformation monitoring frames, and metal pads; the eddy current sensors are fixed on the deformation monitoring frames, and are equidistant spaced around the rock-soil mass sample along the height and circumference of the rock-soil mass sample; the deformation monitoring frames are equidistant spaced along the circumference of the rock-soil mass sample; the metal pads are adhered to the outer surface of the high-strength emulsion film which wraps the rock-soil mass sample, and are equidistant spaced along the height and circumference of the rock-soil mass sample; each of the metal pads is directly opposite to the probe of a respective eddy current sensor and keeps a certain distance; the eddy current sensor accurately measures static and dynamic relative displacement between the metal pad and the probe, and calculates a local absolute deformation of the rock-soil mass sample in permeation process from the real time relative displacement;

the temperature sensing control apparatus is installed outside the housing of the triaxial permeation chamber, it comprises a heater, a temperature controller, a thermal probe; the heater is wrapped outside the side ring of the triaxial permeation chamber. By heating the side ring made of stainless steel, the heat is transmitted to the liquid filled in the inner cavity of the triaxial permeation chamber; the temperature controller connects with the heater through wire, it could automatic control the on-off of the heater power supply according to the temperature setting value and the measured temperature of the liquid filled in the inner cavity of the triaxial permeation chamber; a thermal probe extends its probe into the liquid filled in the inner cavity of the triaxial permeation chamber through the thermal probe hole to measure the temperature of the liquid; then the real-time measured temperature data is transmitted to the temperature controller through the wire; the heater, the temperature controller, and the thermal probe together form a closed-loop control device, it can accurately control the temperature of the tested rock-soil mass sample during the permeability test;

the volume/pressure controller is connected to the water supply hole of the triaxial permeation chamber through a conduit; for an assembled triaxial permeation chamber, when the vent is open, the volume/pressure controller could inject or discharge liquid into the inner cavity of the triaxial permeation chamber, when the vent is closed, pressure can be applied to the liquid in the triaxial permeation chamber to exert confining pressure on the rock-soil mass sample;

the bias stress loading apparatus comprises beam, weighing sensor, bearing shaft, bearing, operating platform, load speed controller, vertical shaft, and columns; two columns are vertically fixed on the operating platform for fixing and supporting; the beam is fixed on the column; the vertical shaft is fixed in the middle of the beam; the weighing sensor is fixed at the bottom end of the vertical shaft to measure the axial load; the bearing shaft passes through the bearing shaft hole of the top cover of the triaxial permeation chamber; the top of the bearing shaft connects to the weighing sensor, the bottom end of it is connected to the top of the upper metal cylinder, and it is used to transfer axial load from bottom to top;

the bearing is arranged on the inner wall of the bearing shaft hole of the top cover and is in contact with the side wall of the bearing shaft; the triaxial permeation chamber can rise or fall under the condition that the absolute position of the bearing shaft is fixed;

the main part of the load speed controller is installed inside the operating platform, and the top extends out of the operating platform and contacts with the base of the triaxial permeation chamber to lift or lower the triaxial permeation chamber; because the absolute position of the bearing shaft in top is fixed, raising or lowering the triaxial permeation chamber can realize apply or remove axial compression load on the rock-soil mass sample;

the gas injection apparatus comprises infinite volume controller, booster pump, gas buffer vessel, and pneumatic hydraulic convertor; the infinite volume controller is connected to the hydraulic end of the pneumatic hydraulic convertor through a conduit; the liquid in the infinite volume controller could be input to the hydraulic end of the pneumatic hydraulic convertor in the form of constant volume, pressure and rate;

the booster pump uses compressed air as the power source, which can pressurize helium and send it to the gas buffer vessel through a conduit;

one end of the gas buffer vessel is connected to the booster pump through the conduit, and the other end is connected to pneumatic end of the pneumatic hydraulic convertor through a conduit; the gas buffer vessel buffers the high-pressure gas sent by the booster pump and then sent to the pneumatic end of the pneumatic hydraulic convertor;

the pneumatic hydraulic convertor is made of high-strength stainless steel; the hydraulic end of the pneumatic hydraulic convertor is connected to the infinite volume controller through a conduit, and the pneumatic end is connected to the gas buffer vessel through a conduit; a piston is used internally to isolate the pneumatic end from the hydraulic end;

hydraulic pressure is input into the pneumatic hydraulic convertor through the infinite volume controller; the hydraulic pressure is converted into pneumatic pressure with constant volume, pressure, and rate through the piston in the pneumatic hydraulic convertor, and then the high-pressure gas in the pneumatic pressure end of the pneumatic hydraulic convertor is input into the air inlet of the triaxial permeation chamber through the conduit, so that the high-pressure gas is injected into the rock-soil mass sample;

the ultra-low permeation flow monitoring apparatus comprises four gas flow meters, single-chip microcomputer, four relays and four electromagnetic valves;

the gas from the outlet of the outlet buffer container flows into four branch conduits; the four gas flow meters are installed on four branch conduits respectively to measure the gas flow of the conduit; the four gas flow meters have different ranges;

the gas flow meters connect to the single-chip microcomputer with wires, and the digital flow signal is output to the single-chip microcomputer; the four electromagnetic valves are respectively installed on the four branch conduits to control the on-off of gas on the branch conduit;

the four relays connect to the four electromagnetic valves respectively with wire; the relays connect to the single-chip microcomputer; the single-chip microcomputer controls the on-off of the four relays respectively, so as to control the on-off of the four electromagnetic valves;

the single chip microcomputer reads the measured flow data of the four gas flow meters, automatically select the branch conduit of the optimal range flow meter according to the real-time measured flow data, and control the on-off of the four relays to control the on-off of the four electromagnetic valves automatically, so that the gas flow in the branch conduit of the optimal range flow meter is on while the gas flow in other branch conduits is off;

the gas flowmeter, single-chip microcomputer, four relays and four electromagnetic valves work together to realize the automatic switching of each branch conduit and continuously and automatically monitor the gas flow of the air outlet of the triaxial permeation chamber;

the bias stress loading apparatus pushes the base upward through the load speed controller to apply axial load; the loading mode could be stress control and displacement control; it could continuously load and unload;

one end of the outlet buffer container is connected to the air outlet of the triaxial permeation chamber through a conduit, and the other end is connected to the ultra-low permeation flow monitoring apparatus through a conduit; the gas from the air outlet of the triaxial permeation chamber is buffered in the outlet buffer container, and the flow of it is measured by the ultra-low permeation flow monitoring apparatus;

the bottom of the outlet buffer container is also provided with a safety valve and an exhaust valve, which can automatically relieve the pressure when the pressure in the outlet buffer container exceeds the upper limit pressure of the safety valve to ensure safety; the exhaust valve is used to manually discharge the gas in the outlet buffer container after the test.

* * * * *